Patented Aug. 11, 1925.

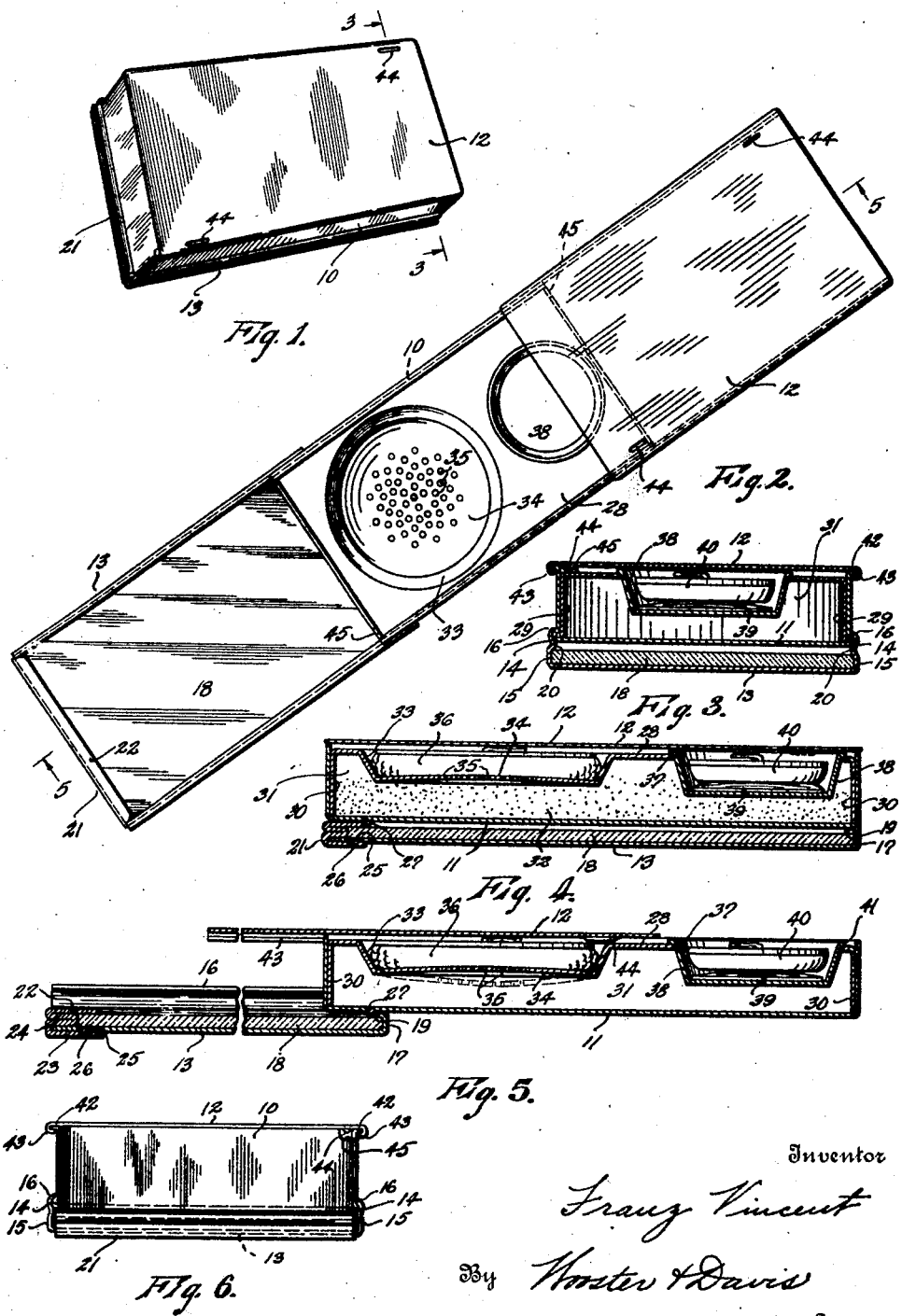

1,549,396

UNITED STATES PATENT OFFICE.

FRANZ VINCENT, OF BRIDGEPORT, CONNECTICUT.

VANITY BOX.

Application filed December 19, 1923. Serial No. 681,476.

*To all whom it may concern:*

Be it known that I, FRANZ VINCENT, a citizen of the United States, residing at Bridgeport, county of Fairfield, State of Connecticut, have invented a new and useful Vanity Box, of which the following is a specification.

This invention relates to vanity boxes of the type which comprises a small container adapted to carry one or more kinds of powder with puffs for use with the same and a mirror, and has for an object to provide a box of this type which will be simple in construction, will occupy a relatively small space, in which the various powders and puffs are easily accessible, in which a larger mirror may be used than can be supplied in the ordinary type of box, and in which the mirror may be used without opening the box or the cover for the powder compartments.

It is also an object of the invention to provide a box of this type which is adapted to carry white powder and also rouge with different puffs for each, but in which a single cover will allow access to both at the same time or either one independently of the other.

With the foregoing and other objects in view, I have devised the construction illustrated in the accompanying drawing forming a part of this specification, similar reference characters being employed throughout the various figures to designate corresponding elements. In this drawing, Fig. 1 is a perspective view of the box closed.

Fig. 2 is a top plan view, showing the box fully open to allow access to both the white powder and the rouge, and also to expose the mirror.

Fig. 3 is a transverse section on an enlarged scale taken substantially on line 3—3 of Fig. 1.

Fig. 4 is a central longitudinal section through the box when closed.

Fig. 5 is a longitudinal section substantially on line 5—5 of Fig. 2 but showing the cover in position to expose the rouge only, and Fig. 6 is an end elevation of the box closed and looking from the left of Fig. 4.

The box proper comprises three main sections, a body 10 closed on the lower side by a bottom 11 but open at the top which is closed by a cover 12, and the third section being a mirror holder or support 13 which is also carried by the body but below the bottom thereof. The box is preferably substantially rectangular, as shown, and the cover and mirror support are so connected with the body as to slide longitudinally thereof as this is the most convenient and easily operated arrangement.

As a means for supporting the mirror holder the sides of the body are provided with longitudinally extending beads or ribs 14 formed preferably by bending outwardly the side walls of the body closely adjacent the bottom 11, and the sides 15 of the mirror holder extend upwardly and are bent inwardly over these beads, as shown at 16 to form a sliding engagement therewith. As the metal is resilient sufficient pressure will be provided between these sides to retain the mirror holder in any given position but will at the same time allow easy shifting of this holder to expose or cover the mirror. At one end the holder has an upwardly extending flange 17 forming a stop for the inner end of the mirror 18 and this flange also extends inwardly over the top of the mirror, as shown at 19. The side walls of the holder are curved inwardly a slight distance over the top of the mirror, as shown at 20, to form guides and retaining means for the mirror. The opposite end of the holder is left open to allow easy insertion of a mirror, both when the box is assembled or it is desired to renew the mirror should it become broken. For retaining the mirror in the holder I provide a spring clip 21. This clip is preferably shaped, as shown in Figs. 4 and 5, so as to provide parallel top and bottom sections 22 and 23 respectively, so located that they extend over the top of the mirror and under the bottom of the holder, the intermediate portion being bent upon itself, as shown at 24, to properly space the top and bottom sections. For retaining the clip in position the bottom wall of the holder 13 is provided with a recess or opening 25 into which a projection 26 carried by the bottom section 23 may project, the resiliency of the metal holding this projection in the recess to prevent accidental displacement of the clip, but allowing disconnection from the mirror holder if desired.

The bottom 11 of the body 10 is provided adjacent one end with a projection 27, preferably formed by pressing the metal outwardly, which lies in the path of movement of the upper end 19 of the flange 17 and also the top 22 of the clip 21 to limit movements of the mirror holder in opposite directions. Thus, in assembling, the mirror holder is slid onto the body from the right, as viewed in Fig. 5, before the clip 21 is placed in position, its movement to the left being limited by engagement of the top 19 against the projection 27. The clip 21 is then placed in position and will prevent withdrawal of the mirror holder from the body by engagement of its top 22 with the projection 27, as shown in Fig. 4. Thus the mirror holder may be easily slid outwardly to expose practically the whole surface of the mirror for use, as shown in Figs. 2 and 5, but its inward movement to closed position will be limited by the clip 21. The mirror holder may, however, be easily removed from the body if the clip 21 is first removed. It will be apparent that, as the mirror holder is entirely independent of the cover 12 for the powder compartments and is practically coextensive with the dimensions of the box, a maximum sized mirror may be used and it may be exposed for use if desired without opening the powder compartment.

The powders are carried in the body and I preferably provide means for having two different kinds of powder which, of course, must be kept separated. I prefer to provide means for carrying the white powder in the loose condition rather than in a compact, as a great many users prefer to mix their own white powder. For this purpose I provide a table 28 which has side and end walls 29 and 30 respectively at right angles to the surface of the table and are arranged to fit within the sides and ends of the body, the lengths of these walls being such that when they engage the bottom 11 the table will be properly positioned with respect to the cover 12, and will also provide a sufficient space 31 for the loose powder 32. The top of the table is provided adjacent one end with a depression 33 having a flexible resilient bottom 34 which is also provided with a number of perforations 35. The depression is of sufficient depth to carry a puff 36 and the flexible bottom is so constructed that it is normally arched somewhat, as shown in Figs. 4 and 5. When it is desired to remove some powder on the puff a pressure on top of the puff will force the bottom downwardly to the dotted line position in Fig. 5 which will force some powder through the openings, and then when the pressure is removed the bottom springs back to the full line position and distributes the powder onto the puff.

Adjacent its opposite end the table is provided with an opening 37 in which is adapted to be seated a cup 38 for carrying a rouge compact 39 and a puff 40 for use therewith. The side walls of this cup are tapered as shown so as to frictionally engage the edges of the opening, and there is an outwardly extending flange 41 at the top thereof to limit the inward movement of the cup and to also facilitate its removal when desired. The opening 37, when the cup is removed, provides a convenient means through which new powder may be placed within the space 31.

The cover 12 is preferably also slidably mounted on the body member. A convenient and simple means for doing this is to provide outwardly extending flanges or beads 42 along the opposite sides of the body adjacent the top thereof, and to bend downwardly and inwardly the side edges 43 of the cover to provide grooves to receive these beads or flanges. The resiliency of the metal will form a frictional engagement between these elements which will hold the cover in any adjusted position, but will allow shifting of the cover when desired. For retaining the cover on the body to prevent accidental removal thereof the cover is provided adjacent two diametrically opposite corners with inwardly extending projections 44, these projections being preferably formed by pressing the metal of the cover inwardly, and the end walls of the body member are provided in their upper edges adjacent the corresponding diametrically opposite corners with notches 45 in alignment with the projections 44, there being one notch in each end wall. It will thus be apparent that the cover may be slid in either direction from the body member to expose either the puff 36 for the white powder or the puff 40 for the rouge without exposing both, but that both may be exposed if desired by moving the cover to the extremes of its movement. However, although the cover may be slid from the body in either direction it is prevented from accidental removal from the body by engagement of one of the projections 44 with an end wall of the body. The notch 45 in the opposite end wall will allow passage of this projection to allow opening of the cover.

It will be apparent from the foregoing description that the box is very simple in construction and may be manufactured at comparatively low cost. Also that a maximum capacity for the powder and necessary devices for use therewith will be secured in a minimum of space, and that by a mere sliding movement of the cover either the puff for the white powder or the puff for the rouge will be exposed without exposing the other, or by a further movement of the cover both may be exposed at the same time. Also that as the mirror is not carried within the body of the box and is mounted independently of the cover it may be exposed for use at any time without opening the powder compartments. Furthermore, the peculiar construction allows use of a maximum sized mirror which is completely enclosed and protected against breakage.

Having thus set forth the nature of my invention, what I claim is:

1. A vanity case comprising a body adapted to hold powder and a puff and open at the top thereof, a cover for said open top having slidable connection with the body whereby it may be moved to cover and uncover the same, a mirror holder slidably mounted on the bottom of said body, and a mirror carried by said holder on the inner side thereof.

2. A vanity case comprising a body adapted to hold powder and puffs for use therewith and open at the top, a cover for said top having sliding connection with the body and adapted to be slid in opposite directions from said body, a mirror holder slidably mounted on the bottom of said body, and a mirror carried by the holder on the inner side thereof.

3. A vanity case comprising a body adapted to hold powder and puffs for use therewith and open at the top, a cover for said top having sliding connection with the body and adapted to slide in opposite directions from said body, coacting stop means carried by the body and cover adapted to limit said movement, a mirror holder slidably mounted on the bottom of said body, and a mirror carried by the holder on the inner side thereof.

4. A vanity case comprising a body open at the top, means carried by the body adjacent the opposite ends thereof for carrying powder and rouge respectively, puffs for use therewith, a cover for said open top having a sliding connection with the body, said cover being adapted to slide in opposite directions to uncover either the powder or the rouge, a mirror holder slidably mounted on the bottom of said body, and a mirror carried by the holder on the inner side thereof.

5. A vanity case comprising a body open at the top, means carried by the body adjacent the opposite ends thereof for carrying powder and rouge respectively, puffs for use therewith, a cover for said open top having a sliding connection with the body, said cover being adapted to slide in opposite directions to uncover either the powder or the rouge, coacting stop means carried by the cover and body adapted to limit said sliding movements, a mirror holder slidably mounted on the bottom of said body, and a mirror carried by the holder on the inner side thereof.

6. A vanity case comprising a substantially rectangular body open at the top, said body being provided with longitudinal beads on the opposite sides thereof adjacent the top and bottom, a cover for said open top having sliding connection with the upper beads, a mirror support having sliding connection with the lower beads and a mirror carried by said support on the inner side thereof.

7. A vanity case comprising a substantially rectangular body open at the top, a cover for said top having sliding connection with the body along the opposite sides thereof and adapted for sliding movement from the body at either end, the end walls of said body being provided with notches adjacent two diametrically opposite corners, and downwardly projecting stop lugs carried by the cover adjacent two diametrically opposite corners and in alignment with said notches.

8. A vanity case comprising a body open at the top, a table spaced above the bottom of said body to provide a space for powder, said table being provided with a depression having a flexible perforated bottom, and a cover for said body.

9. A vanity case comprising a body open at the top, a table spaced above the bottom of the body to provide a space for powder, said table being provided adjacent one end with a depression having a flexible perforated bottom and with an opening adjacent the opposite end, a cup adapted to carry rouge and a puff removably mounted in said opening, and a cover for said body.

10. A vanity case comprising a substantially rectangular body open at the top thereof, a table spaced above the bottom of the body to provide a space for powder, said table being provided adjacent one end with a depression having a flexible perforated bottom and adjacent the other end with an opening, a cup adapted to contain powder and a puff removably mounted in said opening, and a cover having sliding connection with said body along the sides thereof, said cover being adapted for sliding movement from both ends of the body to expose either the depression or the cup as desired.

11. A vanity case comprising a body open at the top, a table spaced above the bottom of the body to provide a space for powder, said table being provided adjacent one end with a depression having a flexible perforated bottom and with an opening adjacent the opposite end, a cup adapted to carry rouge and a puff removably mounted in said opening, a cover for said body, a mirror support slidably mounted on the bottom of the body, and a mirror carried on the inner side of said support.

12. In a device of the character described, a body, a mirror support, a mirror carried by said support on the inner side thereof, means for slidably connecting the support with the bottom of the body to allow exposure of the mirror, said mirror being slidable into the support from one end thereof, a clip removably carried by the support at said end to hold the mirror in position, and a stop carried by the body adapted to coact with said clip to prevent movement of the support in one direction.

13. In a device of the character described, a substantially rectangular body, a mirror support mounted for sliding movement on the bottom of said body, a mirror carried by said support on the inner side thereof, said mirror being slidable into and from the support, said support being provided at one end with a flange extending above the top of the mirror to provide a stop, a removable spring clip at the opposite end to retain the mirror in the holder, and stop means carried by the body adapted to coact with said flange and clip to limit movements of the support in opposite directions.

In testimony whereof I affix my signature.

FRANZ VINCENT.